O. MOBLEY.
TIRE TOOL.
APPLICATION FILED FEB. 18, 1920.
1,392,591.
Patented Oct. 4, 1921.
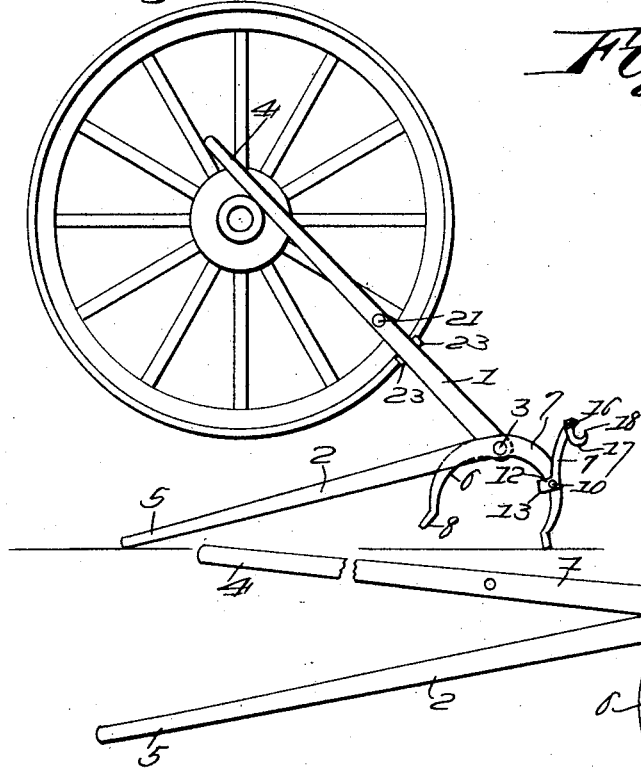
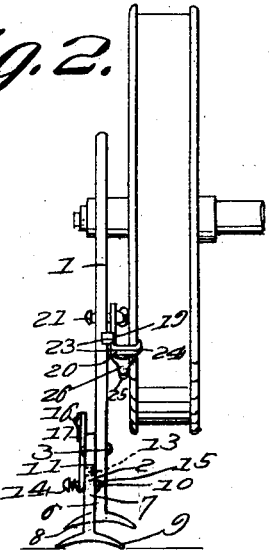
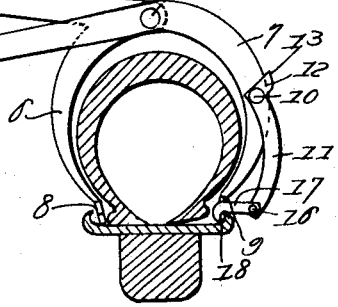
Inventor
Ora Mobley,
By Watson E. Coleman.
Attorney

UNITED STATES PATENT OFFICE.

ORA MOBLEY, OF CINCINNATI, OHIO.

TIRE-TOOL.

1,392,591. Specification of Letters Patent. Patented Oct. 4, 1921.

Application filed February 18, 1920. Serial No. 359,730.

*To all whom it may concern:*

Be it known that I, ORA MOBLEY, a citizen of the United States, residing at Cincinnati, in the county of Hamilton and State of Ohio, have invented certain new and useful Improvements in Tire-Tools, of which the following is a specification, reference being had to the accompanying drawings.

This invention relates to an improved tire tool, one particularly adapted for applying and removing tires from wheel rims, and an object is to provide an improved tool of this kind including a pair of jaws so disposed as to engage the ground and the hub of the wheel, and having means to engage the clencher flange of the rim to hold the tool in place, while the tire is fed or rolled on the rim by imparting revoluble movements to the wheel.

Another object is the provision of a roller or antifrictional device on said means, to feed or roll the tire on the rim, said means having elements to grip one of the jaws to hold it in place.

A further object is the provision of a device, wherein the two jaws have gripping portions, to engage opposite sides of the tire, in combination with a hook member carried by one of the jaws for engagement with one of the clencher flanges, whereby upon closing the jaws, the tire may be compressed, and the tool moved in a plane laterally of the wheel, to pull the tire from engagement with the rim.

A still further object resides in the provision of means whereby the hook device can be moved out of the way, so that one jaw and the handle of the other jaw may engage the ground to support the tool when applying a tire to a rim.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of an automobile wheel showing the same jacked up and showing the tool in applied position for putting a tire on a rim, Fig. 2 is an edge view of the wheel, also showing the tool in applied position, whereby the tire may be rolled or fed on the wheel as it is rotated, Fig. 3 is an enlarged view of the felly and the rim of a wheel showing the tool in applied position and removing the tire from the rim; and Fig. 4 is a detail view of one of the parts of the tool.

Referring to the drawings, 1 and 2 designate a pair of members which are pivotally united as at 3. These members have handles 4 and 5 and the gripping jaws 6 and 7. The jaw 6 extends from the member 1 in an arcuate direction from one edge of the member and terminates in a laterally extending jaw plate 8. The jaw 7 merges in an arcuate direction from the member 2 and also terminates in a jaw plate 9. The members 1 and 2 are pivotally united so that the jaws 6 and 7 are in opposing relation so that when the jaws engage opposite sides of a tire, the jaw plates 8 and 9 will be in close position to the clencher flanges of the tire. A bolt 10 extends transversely of the jaw 7, and pivotally mounted upon the bolt 10 is a curved strip 11. One end of the strip or arm 11 has a right angular extension 12 provided with a lateral lug 13, which overlies the edge of the jaw 7 of the member 2, in order to hold the pivoted arm 11 in the position in which it is shown in Fig. 3. The pivot bolt 10 is long enough to receive a coil spring 14, between the pivoted arm 11 and the nut 15 of the bolt. By adjusting the nut toward the arm 11, the tension of the spring can be regulated. The spring 14 acts to hold the pivoted arm adjacent the side of the jaw 7, so as to retain the lateral lug 13 in a position to overlie the edge of the jaw 7. Pivoted to the arm or strip 11 as at 16 is a hook 17, the hook end 18 of which is adapted to engage one of the clencher flanges, when the tool is in applied position as shown in Fig. 3. The hook 17 constitutes means to support the arm 11, to hold it in place, whereby the tool may be rocked upon the pivot bolt 10 in a plane laterally of the wheel, whereby the tire may be removed from the rim. When the tool is applied as shown in Fig. 3, and the handles of the members 1 and 2 are moved toward each other, the jaws 6 and 7 will compress the sides of the tire, particularly where the jaw plates 8 and 9 engage, thereby disengaging the clencher flanges of the tire from the clencher flanges of the rim. The tool may then be moved in a plane laterally of the wheel as previously stated, the tool pivoting upon the bolt 10, the tire will be pulled out of engagement with the rim.

A tool retaining device 19 is provided, and it is carried by the member 1. This tool retaining device comprises an angular plate 20, which is pivotally mounted upon the bolt 21 passing transversely through the member 1. The angular plate 20 is provided with a pair of spaced lugs 23, to straddle the member 1 in order to hold the retaining tool in position, when it is employed in connection with the tool, for applying tires to tire engaging rims. The lateral arm of the angular plate 20 terminates in a hook 24 adapted to engage one of the clencher flanges of the rim to assist in supporting the tool in position. Rising from the lateral arm of the angular plate 20 is a pin 25 on which an anti-frictional roller 26 is rotatably mounted.

In applying tires to rims, the tool is positioned as shown in Figs. 1 and 2. In this case the pivoted arm or plate 11 has been moved laterally against action of the spring 14 whereby it can be moved out of the way so that the jaw plate 9 of the jaw 7 may engage the ground. The end of the handle of the jaw 7 is also disposed in engagement with the ground. When the member 2 is so disposed, the member 1 is moved on its pivot so as to contact with the hub of the wheel as shown in Fig. 1. In arranging the tool a shown, the wheel is first jacked up and after the tool is placed in position, the angle plate or retaining device 20 is adjusted so that the hook 24 may engage the clencher flange of the rim to hold the tool in position. It will be noted that when the tool is so disposed the anti-frictional roller is in a position adjacent the clencher flange of the rim so that the tire may be fed or rolled upon the wheel. This is accomplished by first placing the tire adjacent the side of the wheel with part of the tire overlying one of the clencher flanges as shown, with the tire adjacent the anti-frictional conical roller. The wheel and tire are then moved together revolubly and when the wheel and tire are so moved, the tire will cam against the anti-frictional roller and cause it to be forced laterally upon the rim of the wheel, and as the wheel is rotated and the tire is rolled upon it, the operator may manipulate the tire so that the clencher flanges of the tire may engage the clencher flanges of the rim.

It is obvious that the plate 20 can be mounted on either member of the tool. Furthermore, the roller 26 may be any suitable shape, either conical as shown in Fig. 2 or bell shaped as illustrated in Fig. 4. Also the bolt 21 which fastens the plate 20 to one of the members of the tool passes through the center of the plate so as to hold the plate adjacent the member in order to have a firmer bearing than if the bolt should be extended through the end of the plate. It is obvious that the plate 20 will not interfere with the closing of the members of the tool. Moreover, the arm or strap 11 can be mounted upon either of the members of the tool. However, the arm 11 and the plate 20 are mounted upon their respective members preferably as illustrated.

The invention having been set forth, what is claimed as new and useful is:

In a tool for the purpose indicated, the combination with a support adapted to assume an inclined position engaging the ground and the hub of a wheel, of an L-shaped plate disposed adjacent the side of the support nearest the wheel and provided with means passing through the plate and the support to connect the plate to the support, said plate having lateral lugs, one engaging on each edge of the support, the lateral arm of the L-shaped plate provided with a hook at its extremity to engage the flange of the rim, and a bell-shaped cone rotatably mounted on the lateral arm of the L-shaped plate, with the marginal edge of the larger end of the cone approximating and partially overlying the root of the hook, acting to force the tire upon and in engagement with the rim.

In testimony whereof I hereunto affix my signature.

ORA MOBLEY.